C. ELLIS.
PROCESS OF HYDROGENATING FATTY MATERIALS.
APPLICATION FILED OCT. 21, 1915.
1,285,959.
Patented Nov. 26, 1918.
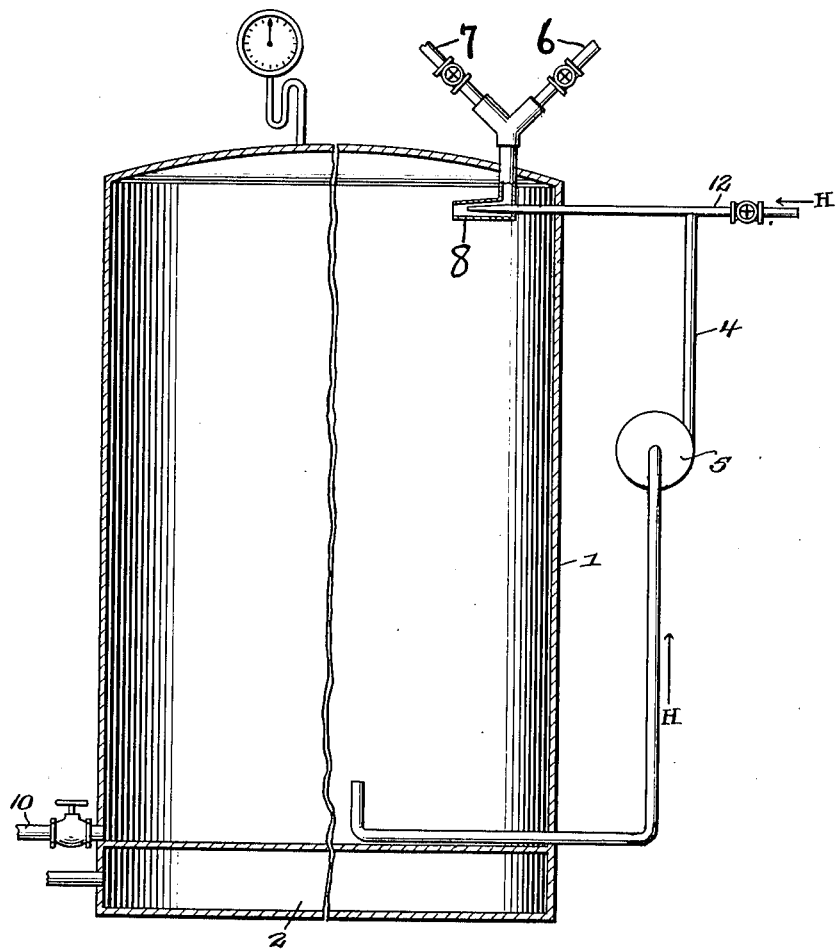

UNITED STATES PATENT OFFICE.

CARLETON ELLIS, OF MONTCLAIR, NEW JERSEY.

PROCESS OF HYDROGENATING FATTY MATERIALS.

1,285,959.   Specification of Letters Patent.   Patented Nov. 26, 1918.

Continuation in part of application Serial No. 686,988, filed March 29, 1912. This application filed October 21, 1915. Serial No. 57,094.

*To all whom it may concern:*

Be it known that I, CARLETON ELLIS, a citizen of the United States, and a resident of Montclair, in the county of Essex and State of New Jersey, have invented certain new and useful Improvements in Processes of Hydrogenating Fatty Materials, of which the following is a specification.

This invention relates to the hydrogenation of oils and relates particularly to a procedure or treatment involving the handling of large quantities of oil in a cheap and efficient manner.

The procedure or organized series of correlated steps involved herein in the preferred form hereof are as follows: (1) Formation of catalyzer in a body of the oil. (2) Violently agitating such catalyzer in the presence of, and preferably by means of a strong current of hydrogen, and thereby forming a spray, fog, or mist from the oil during the period of hydrogen addition.

This application is in part a continuation of copending application No. 686,988 filed Mar. 29, 1912 (now Patent 1,217,118) which in turn is in part a division of an application copending therewith, Serial No. 656,100, filed October 2, 1911 (which last mentioned application has now matured into U. S. Patent 1,026,156).

By my invention various greases and fat stock including oleic acid may be hydrogenated. The conversion of oleic acid, using the various commercial forms e. g., red oil, elaine oil, distilled fatty acids from various animal and vegetable oils, recovered oils of textile mills and the like, into stearic acid by the present process is most effective, ordinarily, in the presence of a colloidal catalyst or oil colloid.

Such catalysts as nickel, copper, iron, palladium, platinum, cobalt, chromium, manganese, titanium, molybdenum, vanadium and the like in a finely-divided state, or in the form of their oxids, carbids, silicids, etc., may be employed. The fatty material carries the catalyst preferably in an oil-soluble or colloidal form.

Metallo-organic compounds soluble in oil, which consist of a catalytic metal united to a very weak organic acid, such as oleic acid, are suitable for this purpose; especially as by regulating the temperature properly these metallo-organic compounds may be decomposed in a predetermined manner, setting free the catalyst not as a pulverulent catalyzer but as an "oil-colloid" in a state of extreme subdivision and colloidally dissolved or existing in a state of quasi solution wonderfully conducive to accelerated hydrogen absorption by the fatty material.

In accordance with the process of the present application, I treat the material with hydrogen or water gas as a fog or mist. Mere agitation or simply spraying the material is not suited for the treatment of some oils with water gas. Instead the material requires to be comminuted to an extreme degree. In case atomization is effected by the mutual impingement of two or more streams or jets of oil under pressure, an auxiliary jet of hydrogen or water gas under pressure may be used to further comminute the oil. Thus instead of a spray, a mist or fog is produced, which absorbs hydrogen with great ease; thus making possible the treatment of certain otherwise very resistant greases.

According to the fatty material under treatment the pressure likewise may be varied to suit the particular requirements, although operation at ordinary atmospheric pressure generally is sufficient.

When an oil colloid is to be produced by heating an oil soluble metallo-organic compound to the requisite temperature, the selection of the metallo-organic compound should be made with particular reference to the hydrogen absorptive properties, thermally considered, of the oil to be treated.

The contact of oil and catalyzer with hydrogen is secured by converting the hydrogen and the fatty material and catalyzer into a mist or fog, and thereafter again reusing the residual or unconsumed gas so that the gas travels a cyclic path; thus a more rapid flow of the gas is created which favors absorption.

The oil and catalyzer may be contained in a suitable vessel which is preferably considerably greater in length or height than in diameter, so that the path of travel of the gas through the body of oil is of considerable length. The chamber may be in the form of a conduit whereby maximum contact of oil and gas is secured and the passage of a strong current of hydrogen through such narrow passage produces an "oil-mist" in which the oil absorbs the hydrogen to advantage. The hydrogen gas not absorbed by the oil is collected without any substantial alteration in pressure, and is pumped back so as to come into repeated contact with the oil.

The use of colloidal catalysts broadly, is claimed in my copending application 686,988, and the atomization, spraying or conversion into fog or mist with diluted hydrogen, such as water gas, is claimed specifically in my copending application 84,698, filed March 16, 1916.

The process of the present invention may be carried out in an apparatus such as is shown in the accompanying drawing, in which the figure represents a vertical section of a suitable apparatus. The numeral 1 indicates a tank or chamber of any convenient dimensions, which may be heated by any suitable means, for example by means of the steam jacket shown conventionally at 2. The pipe 4 indicates a gas circulating system, by means of which hydrogen-containing gas is circulated, for example by means of the pump 5, and is injected, together with additional hydrogen or hydrogen-containing gas, from the pipe 12. This hydrogen then is mingled with oil from the pipe 6, carrying colloidal catalyzer introduced from pipe 7 (mingled with oil or other vehicle). By means of the atomizer shown conventionally at 8, a very fine mist of oil particles carrying colloidal-catalyst is produced. At 10 is indicated an outlet through which the product is carried away, this product consisting of the hydrogenated oil and colloidal catalyst, and this oil may be either completely or partially hydrogenated, and in the latter case may again be passed through the apparatus, for example by being reintroduced through the pipe if so desired. If desired a part only of t. product withdrawn from the pipe 10 may be introduced through the pipe 7, and raw oil through 6.

It is to be understood that the invention is not limited to the use of this specific apparatus.

What I claim is:—

1. A process which comprises decomposing, in a body of a liquid organic vehicle containing unsaturated compounds, a metallo-organic compound containing a metal which in the free state is capable of acting as a hydrogenating catalyst united to a fatty acid, whereby such metal is produced in a colloidal state in such organic vehicle, and then atomizing such liquid vehicle, with such colloidal catalyst carried therein, in an atmosphere of a hydrogen-containing gas.

2. A process which comprises atomizing a liquid fatty oil carrying a colloidal nickel, in a moving current of hydrogen gas, separating the hydrogenated product from such oil, and again atomizing the liquid fatty oil material carrying colloidal nickel catalyst with the hydrogen not absorbed in the said first mentioned step.

3. A process of treating fatty oils containing unsaturated bodies, which comprises converting a mixture comprising a catalyst in a colloidal state, and such an oil while in a liquid state into a highly attenuated condition by means of a gas containing free hydrogen, while at a temperature at which said catalyst is active, and thereafter separating unabsorbed gas from the hydrogenated oil product.

CARLETON ELLIS.